(12) United States Patent
Pacheco et al.

(10) Patent No.: US 9,187,179 B1
(45) Date of Patent: Nov. 17, 2015

(54) SEAT PAN CLOSURE MECHANISM

(71) Applicant: AMI INDUSTRIES, INC., Colorado Springs, CO (US)

(72) Inventors: Chad R. Pacheco, Colorado Springs, CO (US); Timothy Brownsberger, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/282,356

(22) Filed: May 20, 2014

(51) Int. Cl.
*B60N 2/32* (2006.01)
*B64D 11/06* (2006.01)

(52) U.S. Cl.
CPC .......... *B64D 11/0691* (2014.12); *B64D 11/064* (2014.12)

(58) Field of Classification Search
CPC ........................ B64D 11/0691; B64D 11/064
USPC .................................................. 297/14, 332
See application file for complete search history.

(56) References Cited

U.S. PATENT DOCUMENTS

| | | | |
|---|---|---|---|
| 4,270,794 A * | 6/1981 | Lewis ............................... | 297/14 |
| 4,460,215 A | 7/1984 | Chamberlain | |
| 4,993,666 A * | 2/1991 | Baymak et al. ............. | 297/14 X |
| 5,489,141 A * | 2/1996 | Strausbaugh et al. ...... | 297/14 X |
| 5,533,774 A * | 7/1996 | Cavanaugh .................. | 297/14 X |
| 5,791,729 A * | 8/1998 | McCormick et al. ........... | 297/14 |
| 6,394,393 B1 | 5/2002 | Mort | |
| 6,478,256 B1 | 11/2002 | Williamson | |
| 6,481,789 B1 * | 11/2002 | Ambasz ..................... | 297/332 X |
| 6,807,690 B1 * | 10/2004 | Satterfield ................. | 297/332 X |
| 6,811,219 B2 | 11/2004 | Hudswell | |
| 6,883,854 B2 * | 4/2005 | Daniel ........................ | 297/14 X |
| 7,350,867 B2 * | 4/2008 | Park ........................... | 297/332 X |
| 7,469,966 B1 * | 12/2008 | Vallee ............................ | 297/332 |
| 7,780,234 B2 | 8/2010 | Grable | |
| 7,883,144 B2 | 2/2011 | Brunner | |
| 7,954,873 B2 * | 6/2011 | Abe et al. .................... | 297/14 X |
| 7,997,654 B2 | 8/2011 | Ferry | |
| 8,002,350 B2 | 8/2011 | Johnson | |
| 8,042,867 B2 | 10/2011 | Meister | |
| 8,091,964 B2 | 1/2012 | Carter | |
| 8,226,163 B1 | 7/2012 | Pearson | |
| 8,376,442 B1 | 2/2013 | Brantley | |
| 8,376,458 B2 | 2/2013 | Hazbun | |
| 8,550,564 B1 | 10/2013 | Kismarton | |
| 8,616,631 B2 | 12/2013 | Grunwald | |
| 8,622,469 B2 | 1/2014 | Hogg | |
| 8,672,399 B2 | 3/2014 | Brunner | |
| 2003/0184129 A1 * | 10/2003 | Honda et al. .................... | 297/14 |
| 2003/0189368 A1 * | 10/2003 | Fewchuk ....................... | 297/332 |

(Continued)

FOREIGN PATENT DOCUMENTS

| | | |
|---|---|---|
| WO | 2012090963 | 7/2012 |
| WO | 2013057137 | 4/2013 |

*Primary Examiner* — Rodney B White
(74) *Attorney, Agent, or Firm* — Snell & Wilmer, LLP

(57) ABSTRACT

A seat closure and retention system comprising a spring, a retention device, a seat, and a housing is disclosed herein. The system may include a tapered ramp surface configured such that as the anchoring device, such as a spring loaded device, approaches a notch and/or bowl shaped portion based on movement of the seat from a substantially horizontal portion to a substantially vertical position. Stated another way, in response to the pin and/or ball of anchoring device making contact with the tapered ramp surface a damper effect is achieved.

11 Claims, 7 Drawing Sheets

(56) References Cited

U.S. PATENT DOCUMENTS

| | | | |
|---|---|---|---|
| 2005/0269842 A1* | 12/2005 | Braun | 297/14 |
| 2012/0199695 A1 | 8/2012 | Isherwood | |
| 2013/0038082 A1 | 2/2013 | Bertocchi | |
| 2013/0241256 A1 | 9/2013 | Marini | |
| 2013/0249264 A1 | 9/2013 | Bertocchi | |
| 2014/0027572 A1* | 1/2014 | Ehlers et al. | 244/118.6 |
| 2014/0224931 A1* | 8/2014 | Weitzel et al. | 244/118.6 |
| 2014/0312173 A1* | 10/2014 | Ehlers et al. | 244/118.6 |
| 2014/0319275 A1* | 10/2014 | Najd et al. | 297/14 X |
| 2014/0375086 A1* | 12/2014 | Schliwa et al. | 297/14 |

* cited by examiner

SEAT PAN CLOSURE MECHANISM

FIELD

The present disclosure relates to a seat closure mechanism, and more specifically, to a seat self-closing and retention system and method.

BACKGROUND

Typically, commercial aircraft cabin attendant seats (CAS) are required to be self-closing and remain closed so the CAS does not interfere and/or block egress from the aircraft. This has typically been accomplished by using a flat or coiled torsion spring combined with a hydraulic damper. The spring provides the closing force, and the damper controls the rate of closure to prevent abrupt motion which can be noisy and possibly cause injury. An improved system is desirable.

SUMMARY

In various embodiments, a seat closure and retention system comprising a spring, a retention device, a seat, and a housing is disclosed herein. The system may include a tapered ramp surface configured such that as the anchoring device, such as a spring loaded device, approaches a notch and/or bowl shaped portion based on movement of the seat from a substantially horizontal portion to a substantially vertical position. Stated another way, in response to the pin and/or ball of anchoring device making contact with the tapered ramp surface a damper effect is achieved.

According to various embodiments, a cabin attendant seat system may include a substantially stationary housing relative to the seat from which the seat is hingeably attached, a spring coupled between the housing and the seat configured to bias the seat to a stowed position, and an retention device coupled to a side surface of the seat configured to engage a shaped housing. The shaped housing may include a steeply curved surface and/or a tapered ramp.

According to various embodiments, a method may include moving a hinged cabin attendant seat from a deployed position towards a stowed position via a torsion spring. The method may include dampening the movement of the hinged cabin attendant seat as the seat moves from the deployed position to the stowed position by interfacing a ball of a ball plunger with a ramp. The ball plunger may be housed on the seat and/or a surface coupled to the seat. The method may include anchoring the seat in a desired stowed position by engaging the ball of the ball plunger in a notch substantially adjacent to the ramp.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Additionally, any reference to without contact (or similar phrases) may also include reduced contact or minimal contact.

Furthermore, any reference to singular includes plural embodiments, and any reference to more than one component or step may include a singular embodiment or step.

Figure 1:
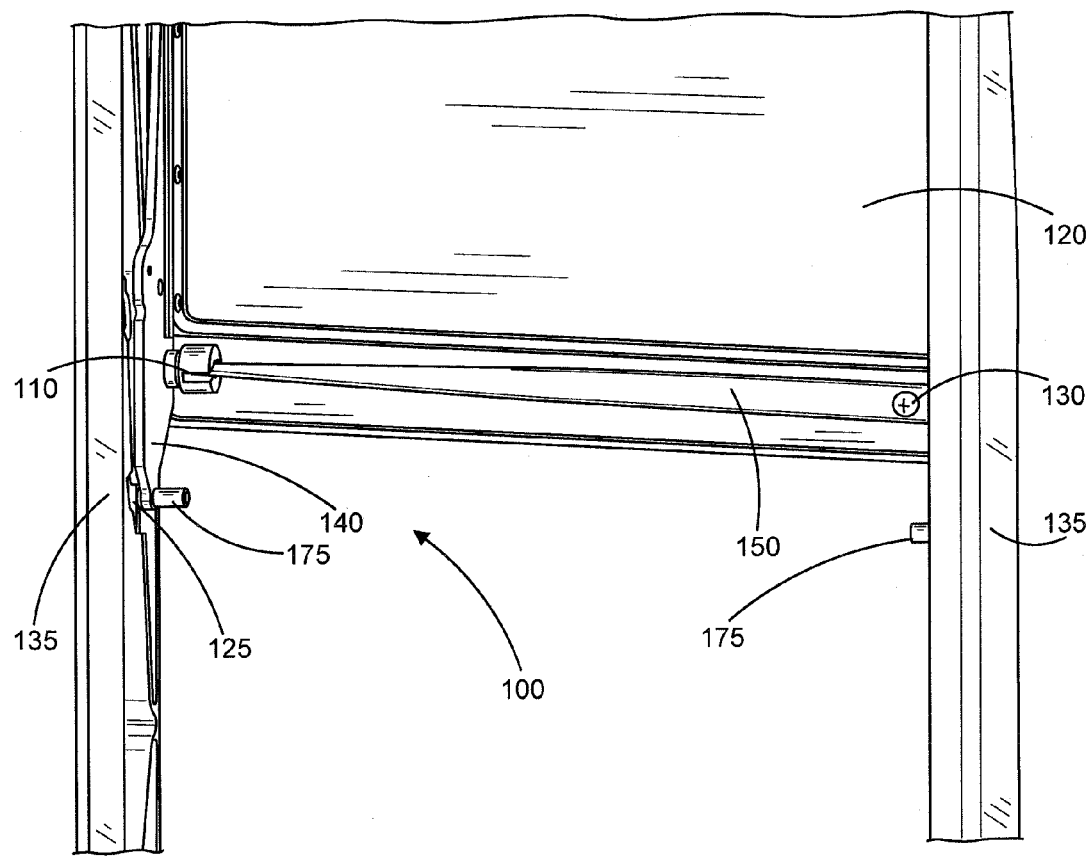
FIG. 1 illustrates a CAS seat closure and retention system with the seat in a stowed position according to various embodiments.
Figure 2:
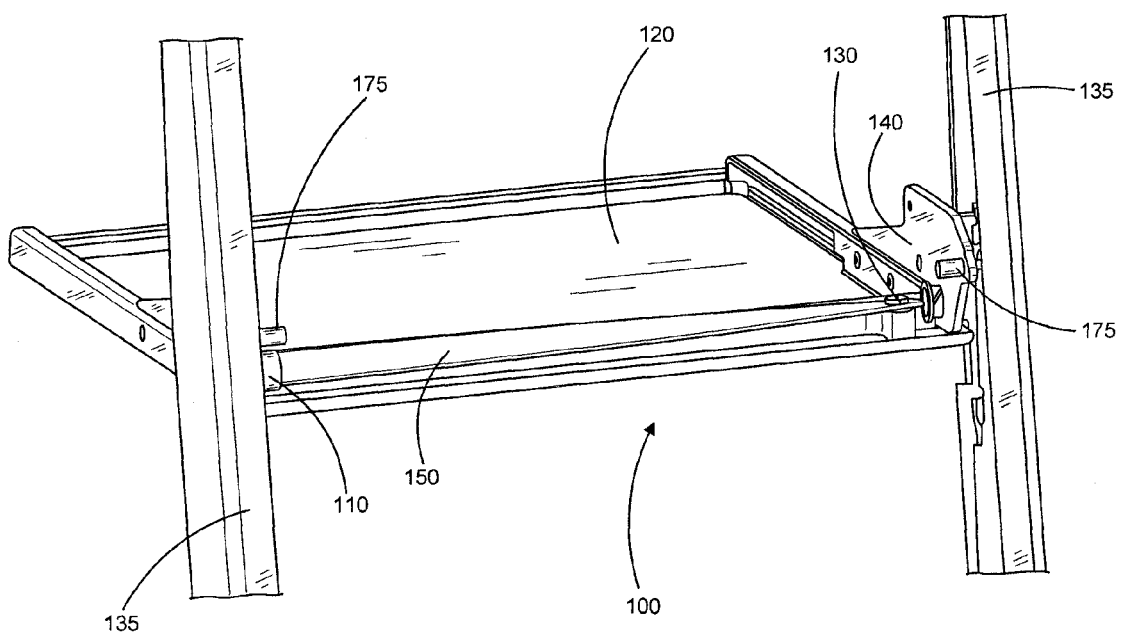
FIG. 2 illustrates a rear view of the CAS seat closure and retention system of FIG. 1 with the seat in a deployed position according to various embodiments.
Figure 3:
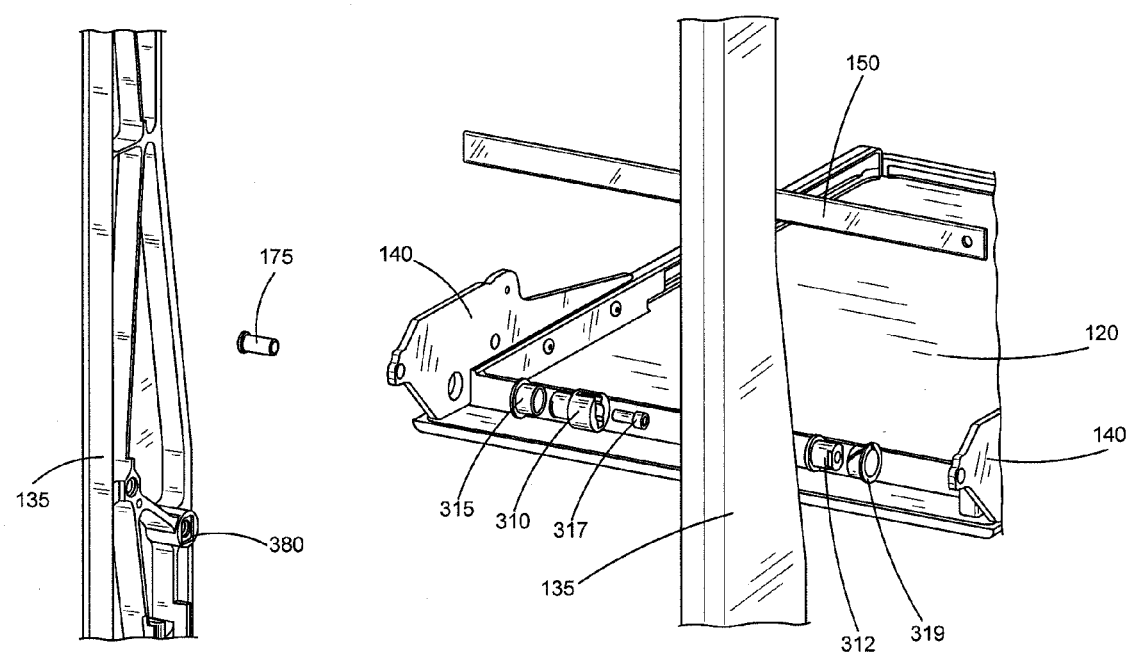
FIG. 3 illustrates an exploded view of the CAS seat closure and retention system of FIGS. 1 and 2 according to various embodiments.

According to various embodiments and with reference to FIGS. 1 and 2, a seat 120 closure and retention system 100 comprising force application mechanism, such as a spring 150, a retention device 175, a seat 120, and a housing 135 is depicted. FIG. 1 depicts the seat 120 in a stowed position. FIG. 2 depicts the seat 120 in a deployed position. The spring 150 may be configured to move a deployed seat 120 to a stowed position. For instance, the spring 150 may be a torsion spring. As depicted in FIGS. 1-3, spring 150 may be a generally flat length of material, such as a stainless steel length of material, which is configured to be fixed on one side, such as with a bushing 310 and anchored to the seat 120 pan by a second securing device 130, such as a bolt or screw. In this way, one side of spring 150 is fixed to a non-moving housing 135, such as seat side panel 140, relative to the moving seat 120 while the other side of spring 150 is attached to the rotating seat 120. In response to torque exerted on spring 150 during rotation of seat 120 relative to housing 135, seat 120 moves seat 120 from the stowed position to the deployed position. Energy is stored in the spring 150 during the exertion of such torque. In response to the removal of torque exerted on spring 150, spring 150 causes seat 120 to retract back to the stowed position.

Retention device 175 may be any desired device configured to temporarily retain seat 120 in a stowed position. For instance, as depicted in FIGS. 1-4, retention device 175 may comprise a spring loaded device such as a spring loaded ball plunger and/or simple detent mechanism. The spring loaded device may encapsulate a spring, such as a coil spring, in a body and comprise a plunger tip or ball on one end. This configuration enables accurate and repeatable end forces. Spring loaded devices may be configured for use where side loading is experienced. Spring loaded devices may provide repeatable projection of the plunger tip or ball. The retention device 175 may be configured to interface with a shaped housing 125.

According to various embodiments and with reference to FIGS. 1 and 2, retention device 175 may be coupled to a side panel 140 of seat 120. For instance, the face of side panel 140 may be oriented substantially normal to the face of seat 120. In this way, as the seat 120 returns from a substantially horizontal level to the substantially vertical stowed position, a retention device 175 anchored on the side panel 140 may move in concert with the movement of the seat 120 for engagement with a shaped housing 125. Stated another way, the retention device 175 may move such that it aligns with a shaped housing 125. Retention device 175 may be configured to move in a same hinged arc of travel as the seat 120. Shaped housing 125 may be any shape such that it forms a suitable location for contact with retention device 175.

FIG. 3 depicts an exploded view of the elements of FIGS. 1 and 2. For instance, spring 150 may be coupled to housing 135 via a bushing 310, such as a metal bushing, coupled to a second bushing 315, such as a plastic bushing, which may be accessed by a keying feature 380 in the housing 135. Bushing 310 may also be configured to facilitate the arc path pivoting movement of seat 120. Seat 120 may pivot on a second metal bushing 312 configured to interface with a second plastic bushing 319.

Figure 4:
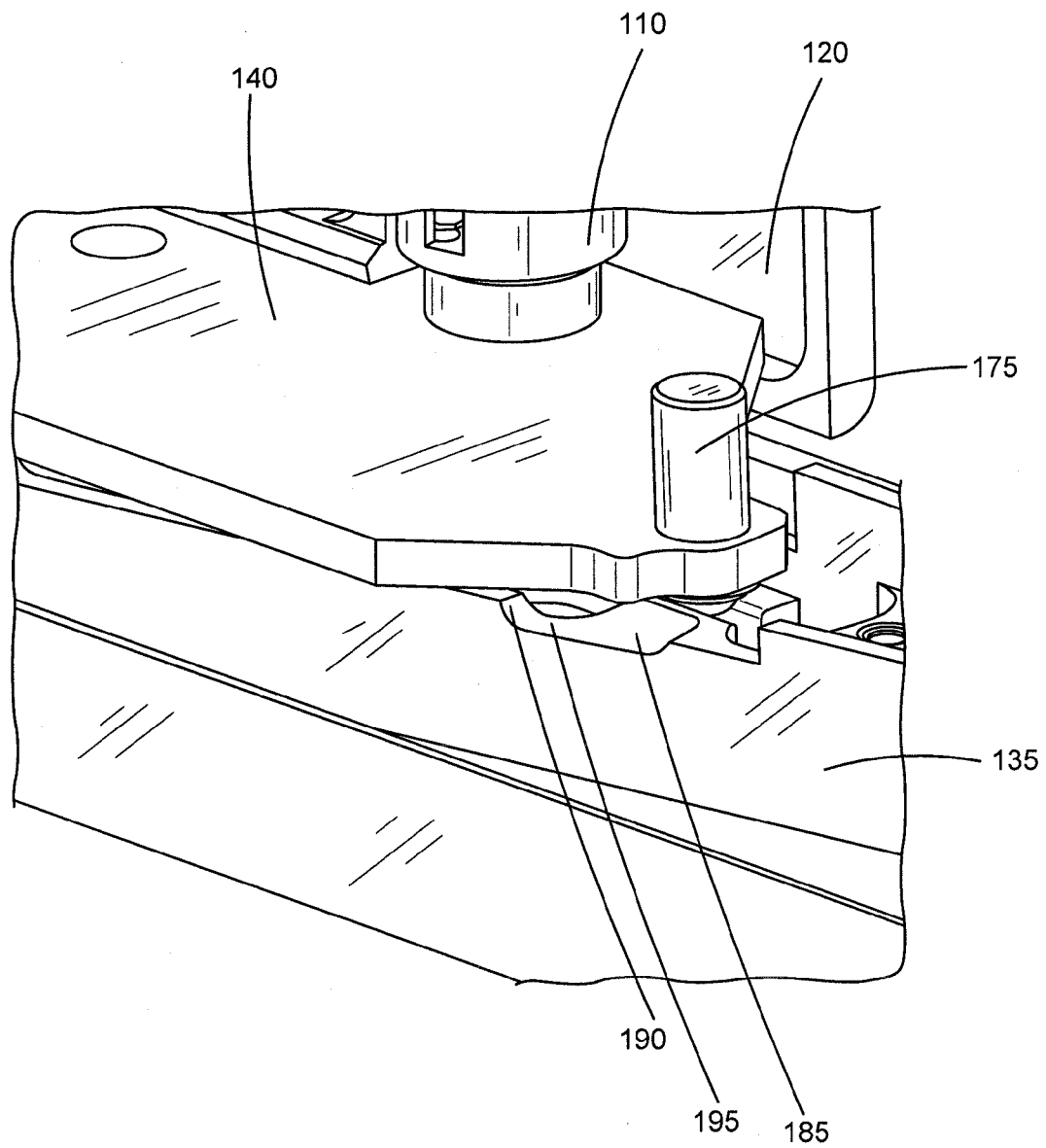
FIG. 4 illustrates a close up view of an anchoring device of the CAS seat closure and retention system according to various embodiments.

According to various embodiments and with reference to FIG. 4, shaped housing 125 may comprise a tapered ramp 185 surface configured such that as the retention device 175, such as a spring loaded device, approaches a notch 195 and/or bowl shaped portion based on movement of the seat 120 from a deployed position to a stowed position the ball shaped plunger tip may make contact with and gradually extend from its housing as the ball shaped plunger tip travels along the tapered ramp 185. In response to the pin and/or ball of retention device 175 making contact with the tapered ramp 185 surface, the speed of the self-closing seat 120 may be reduced. The friction of the tapered ramp 185 may act to counter or dissipate the kinetic energy of the seat 120. Stated another way, in response to the pin and/or ball of retention device 175 making contact with the tapered ramp 185 surface, a damper effect is achieved. In this way, the seat 120 closure to the stowed position is slowed until the seat path of travel reaches a desired stowed position. Similarly, movement from the stowed position to a deployed position may be similarly damped as the retention device 175 makes contact with the tapered ramp 185 surface until the pin is substantially and/or fully retracted within its housing.

Figure 7:
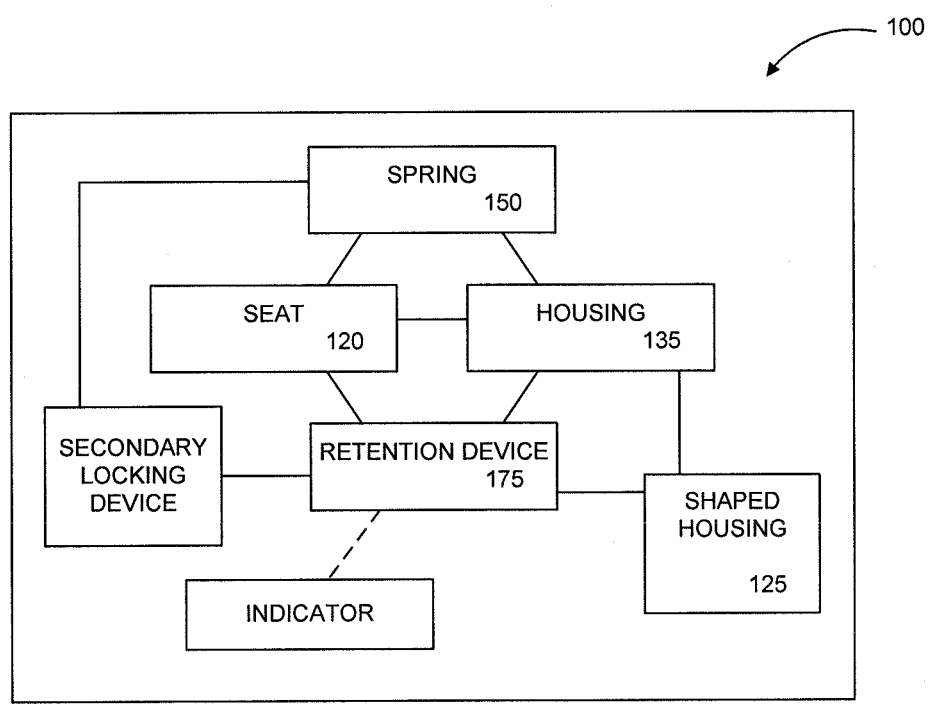
FIG. 7 illustrates a block diagram of retention system 100 elements according to various embodiments.

A notch 195 and/or bowl shaped portion of shaped housing 125 may determine the desired seat 120 stowing location. For instance, the depth of the notch 195 and/or bowl shaped portion of the shaped housing 125 is configured such that the tip of the retention device 175 is fully deployed. In response to the retention device 175 being fully deployed a force must be applied to both overcome a pre-load on the spring 150 and unseat the deployed retention device 175. In this way, seat 120 may remain stowed until pulled down from its stowed position and be biased to return to its stowed position without additional intervention (e.g., self-closing). An indicator, such as an audible indicator, visual indicator, and/or physical indicator may indicate that the retention device 175 is positioned a desired position, such as the fully stowed position. According to various embodiments, retention device 175 may comprise a secondary locking function, such as a safety that may be disengaged prior permitting the seat 120 to be moved from the stowed position to the deployed position. Seat 120 closure and retention system 100 may comprise a secondary locking mechanism to be disengaged prior permitting the seat 120 to be moved from the stowed position to the deployed position (as depicted in FIG. 7). In various embodiments, seat 120 closure and retention system 100 may comprise a secondary locking mechanism to retain the seat 120 in the deployed position.

According to various embodiments and with continued reference to FIG. 4, the shaped housing 125 may further comprise a steeply curved ramp 190 and/or surface past the notch 195 and/or bowl shaped stowed position, configured such that the tip of the retention device 175 may travel past the notch 195 and/or bowl shaped portion. The steeply curved ramp 190 may aid in directing the anchoring device back towards the notch 195 and/or bowl shaped portion to achieve the desired stowing position. This steeply curved ramp 190 may be configured to reduce the noise of the anchoring device fully deploying and present a cushioning to the seat 120 path of travel. In this way, steeply curved ramp 190, located beyond the notch 195 with respect to the tapered ramp 185. The steeply curved ramp 190 may be configured to guide the seat 120 from an angle greater than 90 degrees as measured from the horizontal deployed position of the seat 120 to an angle that is less than or equal to 90 degrees.

Figure 5:
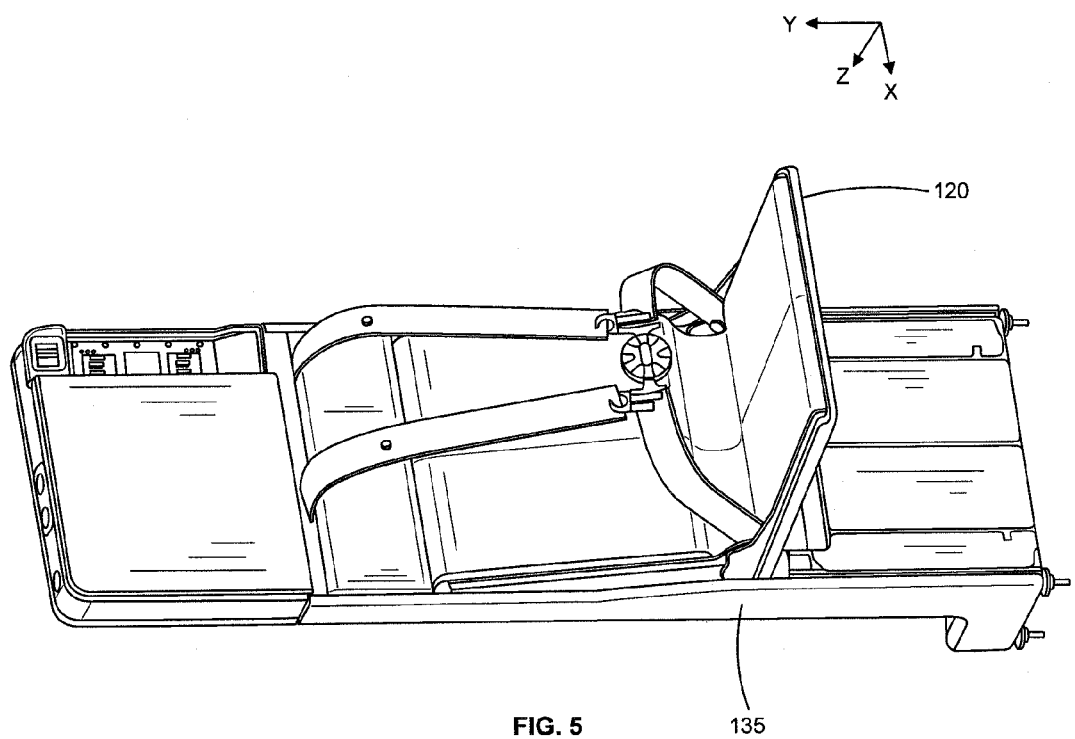
FIG. 5 illustrates a CAS seat closure and retention system with the seat in a deployed position according to various embodiments.
Figure 6:
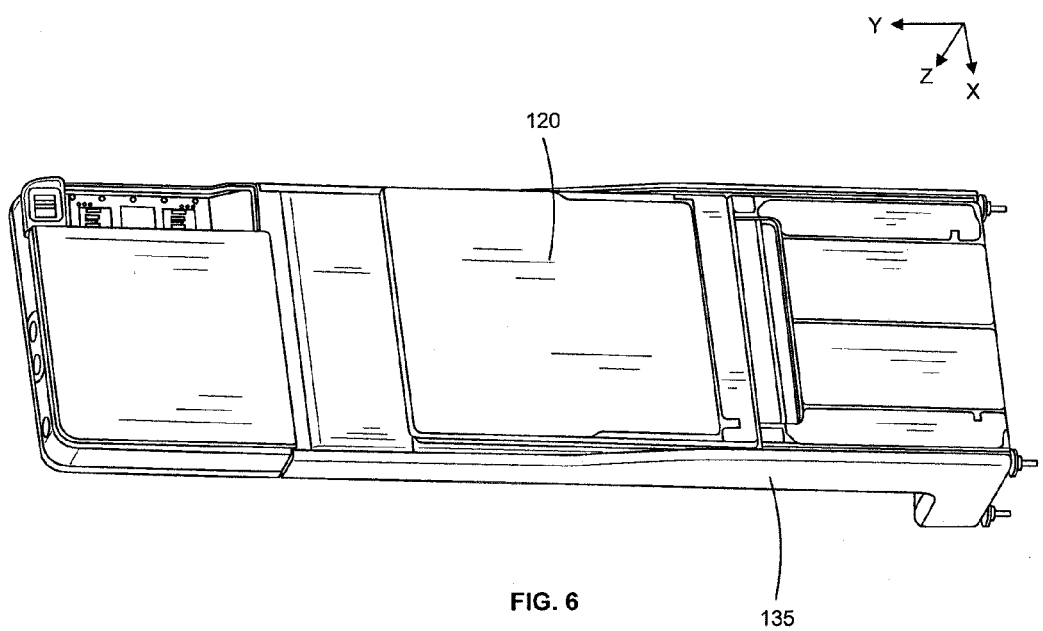
FIG. 6 illustrates a rear view of the CAS seat closure and retention system of FIG. 1 with the seat in a stowed position according to various embodiments.

FIG. 5 depicts an example of the CAS in a deployed position. Steeply curved ramp 190 and/or the tapered ramp 185 may be configured to direct the movement of the seat 120 towards the desired stowed position as depicted in FIG. 6. According to various embodiments, a plurality of retention devices 175 may be utilized on two opposite sides of the seat 120 to engage with two generally parallel housings 135. In this way, the size of the retention device 175 and/or the spring 150 may be reduced. Moreover, a second retention device 175 may act as a fail-safe should one retention device 175 fail to operate as intended. Unlike conventional CAS systems, a hydraulic damper is rendered redundant based on the reduced spring 150 size and utilization of retention devices 175.

According to various embodiments, retention device 175 may be configured to retain seat 120 in any desired location between deployed and stowed. Additionally, a detent system and/or additional shaped housings 125 may be used to temporarily stow the seat 120 in additional positions.

According to various embodiments, the lower spring 150 tension increases the spring 150 life-span. Seat 120 is safer and quieter operation as compared to conventional CAS systems due to the lower forces used to close the seat 120 in retention system 100. The seat 120 is easier and safer to assemble due to not having to wind the spring 150 as tightly as conventional systems. Spring 150 may be anchored by bushing 310 safely by hand. Retention device 175 may be configured to retain the seat 120 closed in the event of a spring 150 failure. Retention system 100 is a lower cost design than conventicle CAS systems with fewer points of failure.

Benefits, other advantages, and solutions to problems have been described herein with regard to specific embodiments. Furthermore, the connecting lines shown in the various FIGS. contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cabin attendant seat system comprising:
   a housing;
   a seat pivotally coupled to the housing;
   a spring coupled between the housing and the seat configured to bias the seat to a stowed position; and
   a retention device coupled to a side surface of the seat configured to engage a shaped housing, wherein the retention device comprises a spring-loaded device and the shaped housing comprises a tapered ramp.

2. The cabin attendant seat system of claim 1, wherein the spring loaded device is a ball plunger.

3. The cabin attendant seat system of claim 2, wherein the ball plunger is configured to function as a damper.

4. The cabin attendant seat system of claim 2, wherein a location of a ball of the ball plunger is determined by a position of the ball plunger along the tapered ramp.

5. The cabin attendant seat system of claim 1, wherein the tapered ramp is positioned substantially adjacent to a notch and a curved surface substantially adjacent to the notch.

6. The cabin attendant seat system of claim 5, wherein the curved surface is configured to guide the seat from a first angle greater than 90 degrees as measured from a horizontal deployed position to a second angle that is at least one of less than or equal to 90 degrees.

7. The cabin attendant seat system of claim 5, wherein a location of the notch determines the stowed position of the seat.

8. The cabin attendant seat system of claim 1, further comprising a second retention device.

9. The cabin attendant seat system of claim 1, wherein the seat is self-closing.

10. The cabin attendant seat system of claim 1, wherein the retention device is configured to retain the seat in the stowed position in response to a failure of the spring.

11. The cabin attendant seat system of claim 1, wherein the spring is pre-loaded while the seat is in the stowed position.

* * * * *